(12) United States Patent
Barman et al.

(10) Patent No.: US 8,645,761 B2
(45) Date of Patent: Feb. 4, 2014

(54) PRECISE FAULT LOCALIZATION

(75) Inventors: Shaon K. Barman, Berkeley, CA (US); Satish Chandra, Dobbs Ferry, NY (US); Emina Torlak, Tarrytown, NY (US)

(73) Assignee: International Business Machines Corporation, Armonk, NY (US)

(*) Notice: Subject to any disclaimer, the term of this patent is extended or adjusted under 35 U.S.C. 154(b) by 456 days.

(21) Appl. No.: 13/006,126

(22) Filed: Jan. 13, 2011

(65) Prior Publication Data

US 2012/0185731 A1    Jul. 19, 2012

(51) Int. Cl.
*G06F 11/00*    (2006.01)

(52) U.S. Cl.
USPC .......................................... 714/38.1; 717/126

(58) Field of Classification Search
None
See application file for complete search history.

(56) References Cited

U.S. PATENT DOCUMENTS

| | | | |
|---|---|---|---|
| 6,966,013 B2* | 11/2005 | Blum et al. ................ | 714/38.1 |
| 7,325,227 B2* | 1/2008 | Henderson et al. .......... | 717/126 |
| 2002/0066077 A1* | 5/2002 | Leung ......................... | 717/126 |
| 2006/0107121 A1* | 5/2006 | Mendrala et al. ............ | 714/38 |
| 2010/0146490 A1* | 6/2010 | Grosse et al. ............... | 717/131 |
| 2010/0223599 A1* | 9/2010 | Ghosh et al. ................ | 717/130 |

OTHER PUBLICATIONS

Cleve, H., et al. "Locating Causes of Program Failures" 27th International Conference on Software Engineering (ICSE 2005). May 2005. pp. 1-10.
Jeffrey, D., et al. "Fault Localization Using Value Replacement" Proceedings of the ACM/SIGSOFT International Symposium on Software Testing and Analysis, ISSTA 2008. Jul. 2008. (11 Pages).
Wang, T., et al. "Automated Path Generation for Software Fault Localization" 20th IEEE/ACM International Conference on Automated Software Engineering (ASE 2005). Nov. 2005, (5 Pages).
Zeller, A. "Isolating Cause-Effect Chains From Computer Programs" Proc. ACM SIGSOFT 10th International Symposium on the Foundations of Software Engineering (FSE-10). Nov. 2002. pp. 1-13.
Zhang, X., et al. "Locating Faults Through Automated Predicate Switching" 28th International Conference on Software Engineering (ICSE 2006). May 2006. (10 Pages).

* cited by examiner

*Primary Examiner* — Michael Maskulinski
(74) *Attorney, Agent, or Firm* — Tutunjian & Bitetto, P.C.; Louis Percello (57) ABSTRACT

Systems and methods for identifying expressions that are potential causes of program bugs are disclosed. A program and at least one input resulting in at least one passing test of the program can be received. Further, at least one plausible repair candidate expression in the program can be identified. In addition, the methods and systems can determine whether replacement of the at least one identified expression with at least one value, which is different from a value provided by the at least one identified expression, maintains the passage of the at least one passing test. Moreover, the at least one identified expression can be output when the replacement maintains the passage of the at least one passing test to enable a determination of a modification of the program that repairs a bug in the program.

25 Claims, 6 Drawing Sheets

PRECISE FAULT LOCALIZATION

BACKGROUND

1. Technical Field

The present invention generally relates to debugging of programs and, more particularly, to determining candidate expressions of programs that are likely causes of program errors.

2. Description of the Related Art

Computer programs frequently suffer from errors encountered upon receiving or processing an unexpected input. Previous approaches for fault localization have mostly relied on the notion of an anomaly, in which the focus of the solution is on determining the difference between a failing execution and previously observed passing executions. The basic idea is that a failing run has an anomalous behavior in some regard when compared to passing runs. For example, a common anomaly detection technique, Tarantula, operates by comparing the statement coverage of passing and failing runs. The anomaly in behavior may stem from executing statements that are rarely, if ever, executed by passing tests. Alternatively, the anomaly can stem from violating invariants that have been discovered to hold during passing executions.

SUMMARY

One embodiment is directed to method for identifying expressions that are potential causes of program bugs that is implemented by a computer processor. The method includes receiving a program and at least one input resulting in at least one passing test of the program. Further, at least one plausible repair candidate expression in the program is identified. In addition, the method includes determining whether replacement of the at least one identified expression with at least one value, which is different from a value provided by the at least one identified expression, maintains the passage of the at least one passing test. Moreover, the at least one identified expression is output when the replacement maintains the passage of the at least one passing test to enable a determination of a modification of the program that repairs a bug in the program.

Another embodiment is directed to a computer readable storage medium comprising a computer readable program code, wherein the computer readable program code when executed on a computer causes the computer to receive a program and at least one input resulting in at least one passing test of the program. The computer readable program code further causes the computer to identify at least one plausible repair candidate expression in the program. In addition, the computer readable program code causes the computer to determine whether replacement of the at least one identified expression with at least one value, which is different from a value provided by the at least one identified expression, maintains the passage of the at least one passing test. Moreover, the computer readable program code causes the computer to output the at least one identified expression when the replacement maintains the passage of the at least one passing test to enable a determination of a modification of the program that repairs a bug in the program.

An alternative embodiment is also directed to a method for identifying expressions that are potential causes of program bugs that is implemented by a computer processor. The method includes receiving a program, a first set of inputs resulting in a failing test of the program, and a second set of inputs resulting in at least one passing test of the program. In addition, a first listing of expressions in the program is generated by symbolizing a first set of expressions in at least a portion of the program and by selecting expressions that are replaceable with corresponding values that result in passage of the failing test with the first set of inputs. Further, a second listing of expressions in the program is generated by symbolizing a second set of expressions in the at least a portion of the program and determining whether replacing expressions in the second set of expressions with values results in failure of the at least one passing test. Moreover, at least one expression in the first listing that is replaceable with a value, which is different from a value provided by the at least one expression in the first listing, that maintains the passage in the at least one passing test is output to enable a determination of a modification of the program that repairs a bug in the program.

Another embodiment is directed to a system for identifying expressions that are potential causes of program bugs. The system includes a plausible expression identifier that is configured to identify at least one plausible repair candidate expression in a program based on a failing test of the program. The system further includes an expression flexibility determination module that is configured to determine whether replacement of the at least one identified expression with at least one value, which is different from a value provided by the at least one identified expression, maintains the passage of at least one passing test. In addition, the system includes a controller that is configured to output the at least one identified expression when the replacement maintains the passage of the at least one passing test to enable a determination of a modification of the program that repairs a bug in the program.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Isolating causes of faults in computer programs from failing tests is a labor-intensive process, with considerable costs. As a result, software producers often ship code with known faults that are deemed too expensive to fix and unlikely to occur in practice. Given that compute cycles are abundant and inexpensive, judicious use of automation for fault isolation and fixing can greatly improve software quality, as well as reduce costs.

Embodiments of the present principles compute expressions that are likely causes of bugs and thus candidates for repair by utilizing relatively inexpensive symbolic methods. The symbolic methods described herein closely approximate an ideal approach to fixing bugs that explores the space of all possible edits to the program to find an edit that repairs the failing test without breaking any passing test. As opposed to computing syntactic edits to an expression of a program, exemplary embodiments approximate the expensive ideal approach by computing the set of values whose substitution for the expression results in a correct execution. Here, an expression is a repair candidate if it can be replaced with a value that fixes a failing test and, in each passing test, its value can be changed to another value without breaking the test. Such an expression is flexible because it permits multiple values; therefore, the repair of the expression is less likely to break a passing test. The values are computed by employing "angelically" nondeterministic statements. Although symbolization of expressions are employed in exemplary embodiments described herein, the repair candidates can be found by simply replacing an expression with a range of concrete values without utilizing symbolic values to evaluate whether the expression is an adequate repair candidate.

As discussed further herein below, embodiments employ a computer-assisted debugging methodology, in which value-based reasoning is used to identify plausible repair candidates in a faulty program. In particular, as indicated above, embodiments can approximate syntactic changes with value changes. For example, instead of checking if the program can be fixed by replacing an expression e with some expression e', embodiments can check whether a failing test can be repaired by replacing the value v of e with some value v'. If v' fixes the test, it can be assumed that it is possible to find an expression e' that evaluates to v'. If no such v' exists, e can be eliminated from the set of plausible repair candidates.

For failing tests with weak filtering power, the value-replacement check can yield too many plausible repair candidates. Thus, in this case, embodiments can advantageously employ passing tests to determine likely expression candidates without knowing an actual expression e' that would rectify the failing test. For example, embodiments can approximate the repair of e in passing tests as follows: if e evaluates to v in a passing test, but the same test continues to pass if v is replaced with a value v'#v, then there is a sufficient level of confidence that e can be replaced with a syntactically different expression e'. In other words, if replacing the expression e with v fixes the failing test, then e has the power to fix a failing test; if it does not break a passing test, then e is amenable to repair—e is flexible and can be changed.

As will be appreciated by those skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
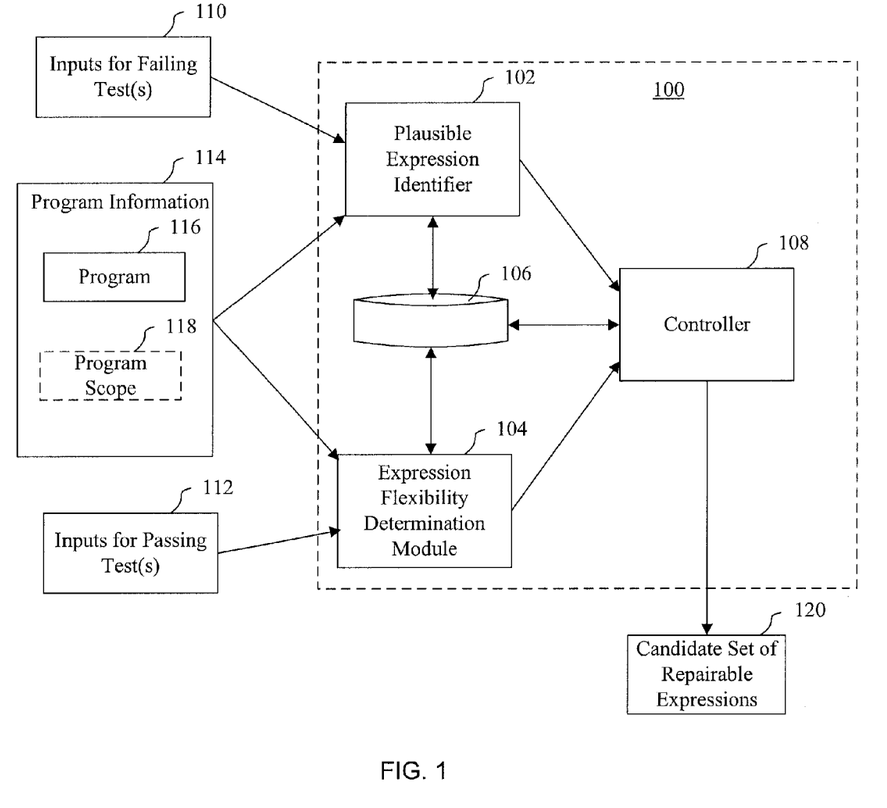
FIG. 1 is a block/flow diagram of an embodiment of a system for identifying expressions that are potential causes of program bugs.

Referring to the drawings in which like numerals represent the same or similar elements and initially to FIG. 1, an exemplary debugging system embodiment 100 is illustrated. It should be noted that any reference to a "set" can include one or more components and does not necessarily mean that it has a plurality of components.

The system 100 can include a plausible expression identifier 102, an expression flexibility determination module 104, a storage medium 106 and a controller 108. As described further herein below, the plausible expression identifier 102 can execute a program of instructions stored on the storage medium 106 to determine one or more plausible expressions for repair by evaluating inputs for one or more failing tests 110 of a program 116. The program 116 can be included in program information 114 provided to the plausible expression identifier 102. The program information 114 can optionally comprise a program scope 118 that is input by a user and can be provided to both the plausible expression identifier 102 and the expression flexibility determination module 104. In addition, the expression flexibility determination module 104 can also execute a program of instructions stored on the storage medium 106 to determine one or more candidate sets of flexible or inflexible expressions by evaluating inputs for one or more passing tests 112 of the program 116. In particular, the controller 108 can employ the candidate set of inflexible expressions to prune plausible expression candidates generated by the plausible expression identifier 102. The controller 108 may, in turn, output a candidate set of repairable expressions 120 indicating to a user which expressions of the program are most likely the cause of the failing tests 110. As indicated above, elements of system 100, such as elements 102, 104 and 108, can be implemented in hardware or both software and hardware, which can include a computer processor.

Figure 2:
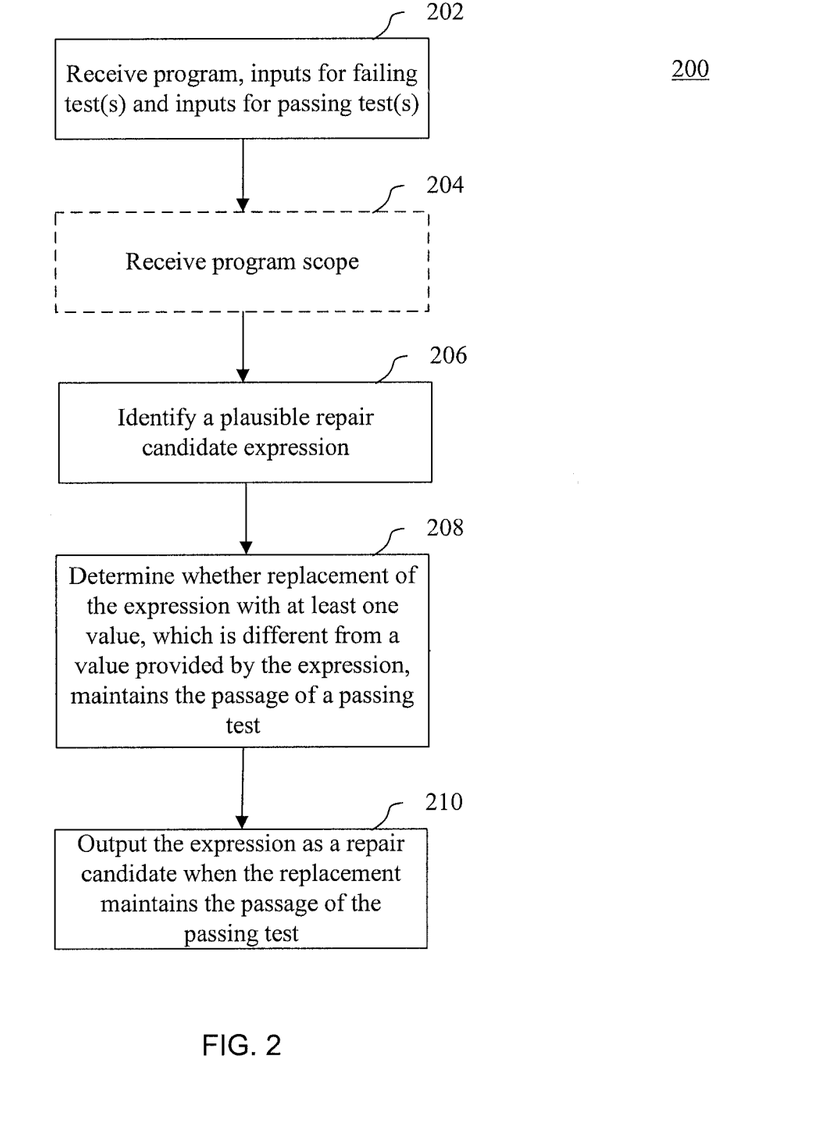
FIG. 2 is a flow diagram of an embodiment of a method for identifying expressions that are potential causes of program bugs.

With reference now to FIG. 2, with continuing reference to FIG. 1, an exemplary method 200 for identifying expressions that are potential causes of program bugs is illustrated. The method 200 can begin at step 202, in which the system 100 can receive a program, inputs for one or more failing tests and inputs for one or more passing tests.

Optionally, at step 204, the system 100 can receive a program scope indicating one or more portions of the program that the system should evaluate for purposes of identifying the candidate set of expressions. For example, based on intuition, observation of runtime logs, or feedback from fault localization tools, such as Tarantula, the programmer or user can demarcate a scope in the code where he believes the defect might lie. By selecting and providing the scope to the system 100, the programmer expresses a hypothesis that altering some expression within the scope can resolve the bug. The system can thereafter attempt to validate the hypothesis in the following steps.

At step 206, the plausible expression identifier (PEI) 102 can identify a plausible repair candidate expression. For example, as indicated above, the PEI 102 can determine that the replacement of an expression with a value, which is different from a value provided or returned by the expression, repairs a failing test for which inputs were provided at step 202. If the determination is made for a prospective expression, then the PEI deems the expression to be a plausible repair candidate. Here, using the inputs for the failing test, the PEI 102 may automatically examine all expressions in the program (or the scope) to find plausible repair candidates and generate a list thereof. For each such candidate, the PEI 102 demonstrates the existence of one alternative value that would have rescued the failing test case.

At step 208, the expression flexibility determination module (EFDM) 104 can determine whether replacement of an expression found at step 206 with at least one value, which is different from a value provided or returned by the expression, maintains the passage of a passing test. This determination is equivalent to determining whether the replacement of the expression with at least one value results in the failure of the passing test. For example, if the replacement of the expression with at least one value maintains the passage of a passing test, then the EFDM 104 can deem the expression to be flexible. The EFDM 104 can employ information from any passing test cases to determine whether the expression is a flexible repair candidate. A repair candidate is flexible if changing the candidate expression can rescue a particular failing test, but doing so would not break one or more of the previously passing tests. Conversely, a repair candidate is inflexible if changing the candidate expression can rescue a particular failing test, but doing so would break one of the previously passing tests. In exemplary embodiments, step 208 can be implemented by evaluating each expression within the program, within a scope, if provided, or found at step 206 to determine their flexibility.

At step 210, the controller 108 can output the expression as a repair candidate based on the determinations made at steps 206 and 208. For example, if the replacement of an expression with a value repairs a failing test and the expression is flexible, then the controller 108 can output the expression as a repair candidate. Alternatively or additionally, if a plurality of expressions is evaluated at steps 206 and 208, then the controller 108 can output a set of repair candidates at step 210. For example, as described further herein below, the determination step 206 can result in a first listing of plausible repair expressions while the determination step 208 can result in a second listing of inflexible expressions. Here, the controller 108 can prune from the first listing expressions provided in the second listing. It should be noted that if all plausible repair candidates are eliminated in this step, then the programmer has either not chosen the scope correctly, if a scope has been provided, or there is indeed no fix to the program that can pass all test cases. Alternatively, the controller 108 can simply output both listings at step 210 to permit the programmer to determine the appropriate candidates. For example, similar to the controller 108, the programmer can select the repair candidates as flexible expressions that are replaceable by a value such that a failing test is repaired. Whether the pruned listing is output or whether both listings generated at steps 206 and 208 are output, when expressions are replaceable with corresponding values, which are different from values that are provided by or computed by the expressions and which maintain the passage of the passing test(s), the expressions are output at step 210.

Figure 3:
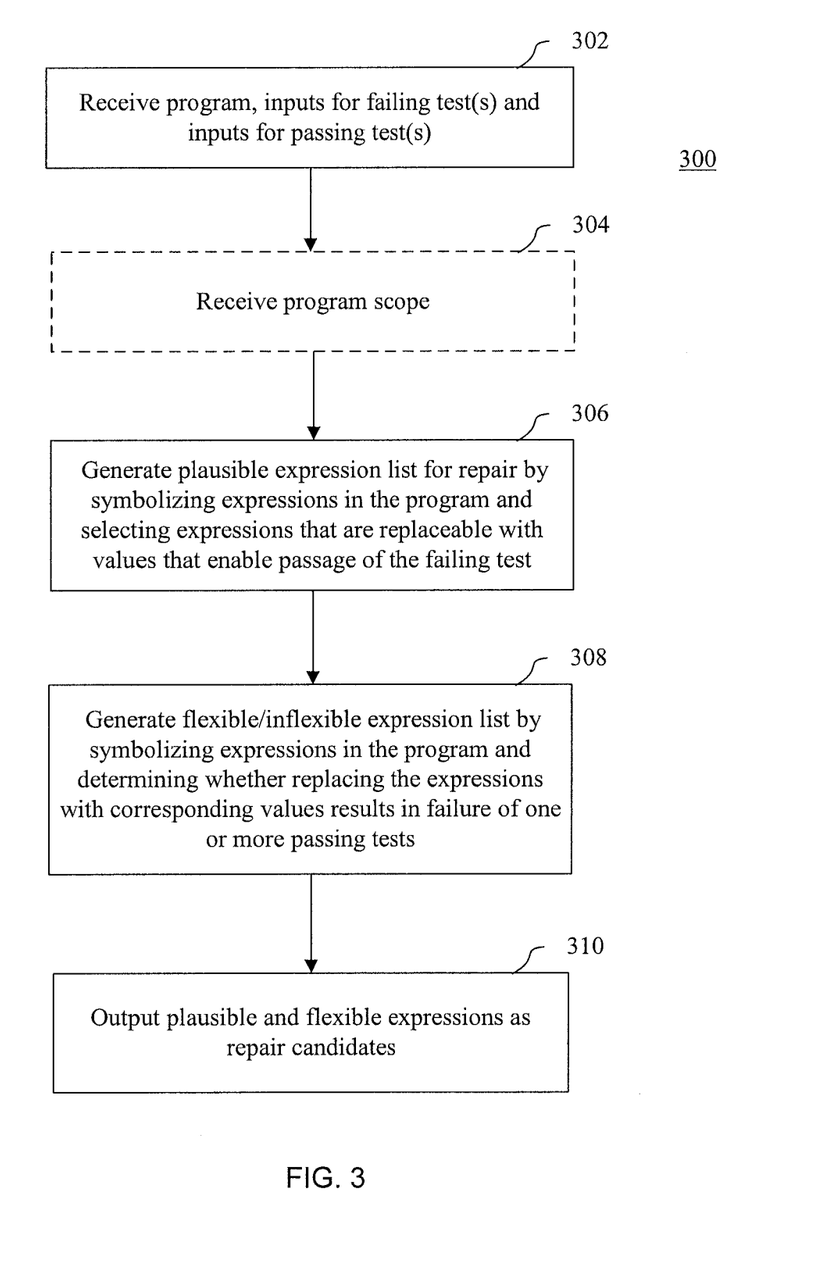
FIG. 3 is a flow diagram of an embodiment of a more specific method for identifying expressions that are potential causes of program bugs.

Referring now to FIG. 3, with continuing reference to FIGS. 1 and 2, a more specific exemplary method 300 for identifying expressions that are potential causes of program bugs. Method 300 can be performed by the system 100 to implement method 200. In accordance with an exemplary aspect, the method 300 can offer a precise list of plausible causes of an error in a program. A cause is denoted as an expression in the program that can plausibly fix the program when replaced by another expression. Here, the system 100 can produce two lists. First, the system 100 can produce a first list of plausible fix candidates, which are expressions that a programmer might consider changing in order to fix a program. Second, the system 100 can produce a second list of expressions that, if changed, are likely to break existing test cases that were previously passing (on the unmodified program). Thus, the second list can be a list of inflexible expressions. Alternatively, the second list can comprise a list of flexible expressions. In other words, the second list can comprise a list of expressions that, if changed, are unlikely to break existing test cases that were previously passing. A programmer can use the list of inflexible expressions to focus his attention only on the expressions that are likely to be correct places to fix—i.e. they appear on the first list, but not on the second list. Conversely, the programmer can cross reference the second list of flexible expressions with the first list and can select the expressions appearing on both the first list and the second list as repair candidates. In accordance with an exemplary aspect, the system 100 can also provide sample values that those expressions could have produced (in place of normal execution) to repair a faulty execution. Such values can often inspire a programmer on how to change and repair a program.

The method can begin at step 302 in which the system 100 can receive a program, inputs for one or more failing tests and inputs for one or more passing tests, as described above with respect to step 202 of method 200. In addition, the system 100 can optionally receive a program scope at step 304, as described above with respect to step 204 of method 200.

At step 306, which can be performed to implement step 206, the PEI 102 can process the program with inputs from a failing test to generate a list of plausible expressions for repair. For example, the PEI 102 can generate the plausible expression list by symbolizing expressions in the program and selecting expressions that are replaceable with values that enable passage of the failing test. For example, the PEI 102 can augment the normal execution of the program by employing a symbolic execution capability. Using this capability, the PEI can designate an expression in the program to produce a symbolic value, as opposed to a concrete value. After such an expression is processed, the state of the program comprises one symbolic value in addition to concrete values the program computed from other, previously executed code. Hereafter, the program operates on this symbolic value algebraically.

For example, the following program code can be augmented so that a concrete value is replaced with a symbolic value:

```
v := e /* e is a designated symbolic expression */
w := v + 1
if (w == 3)
    ...
```

The program assigns a symbolic value 'x' in place of the value that e would compute ordinarily. The next statement would assign 'x+1' to w, which is a symbolic expression. The comparison (w==3) is handled in a special way. It is possible to find a value of 'x' such that the true branch can be taken; and likewise it is also possible to find a value of 'x' such that the false branch is taken. The PEI 102 runs the program along both of these branches. The goal of the PEI 102 here is to find a value of 'x' such that the program passes with the inputs resulting in the failing test. It should be noted that in accordance with an exemplary aspect, only one expression is made symbolic along any execution. It should also be noted that, in alternative embodiments, symbolic values need not be employed at all. For example, as indicated above, the PEI 102, and also the EFDM 104, can simply replace the value to which the expression e would ordinarily compute with a range of concrete values and can run the program using these values to determine the suitability of the expression as a sufficient candidate for repair.

To compute the plausible expression list, the PEI 102 can attempt 'symbolification' on each expression—one at a time—encountered during normal execution. As indicated above, symbolification is the replacement of an expression with a symbolic value. The PEI 102 can include in the plausible candidate list the expressions for which symbolification is able to find a passing run. The PEI 102 can also note in the list the specific value of 'x' that led to the passing run for any given expression evaluated. It should be understood that the expression e need not be just a numeric quantity. For example, the expression e can also be a heap address. In practice, the PEI 102 can optimize an implementation of this technique by attempting symbolification only at selected points, without losing generality. For example, the PEI 102 can be configured to attempt symbolification only at points within a scope of the program provided by a user at optional step 304.

At step 308, which can be performed to implement step 208, the EFDM 104 can process the program with inputs from at least one passing test to generate a list of flexible/inflexible expressions. For example, the EFDM 104 can symbolize expressions in the program and can determine whether replacing the expressions with corresponding values, which are different from the values provided or returned by the expressions, results in failure of at least one passing test. For example, to compute the flexible/inflexible expression list, the EFDM 104 can make use of existing test inputs on which the program has already run correctly. For the inflexible expression list, the EFDM 104 can identify and select expressions which, when forced to produce a different value than in their normal evaluation, cannot pass the program. When the EFDM 104 tests an expression for flexibility, the EFDM 104 symbolizes the expression and constrains it to be unequal to its value in normal execution. The EFDM 104 can add the inflexible expressions thus identified in different passing test cases to form the second list. Alternatively, the EFDM 104 can select and add flexible expressions to generate a flexible expression list simply by adding evaluated expressions that are not inflexible. In other words, the EFDM 104 can add expressions which, when forced to produce a different value than in their normal evaluation, maintain passage the program. As discussed herein below, either list can be employed to determine which of the expressions are sufficient repair candidates.

To illustrate the identification of inflexible expressions, the following example is considered:

```
flag := e
if (flag)
    assert fail
```

Here, all passing test cases will have the value of flag to be false in normal execution. If the expression e is forced to produce a different value than in normal execution, the program will certainly fail. Thus, expression e is inflexible. One benefit of identifying inflexible expressions is that provides the maintainer of a program with an indication that these expressions are likely not causes of program bugs or cannot be fixed.

At step 310, which can be performed to implement step 210, the controller 108 can output plausible and flexible expressions as repair candidates. In particular, the EFDM 104 can output at least one expression in the plausible expression listing that is replaceable with a value that maintains the passage of the passing tests to permit a determination of a modification of the program that repairs a bug in the program. As indicated above, the value is different from the value provided or returned by the corresponding expression that is output. For example, where the EFDM 104 generates an inflexible expression listing, the controller 108 can compare the inflexible expression listing with the plausible expression listing generated by the PEI 102. Further, the controller 108 can remove expressions present in the inflexible expression listing from the plausible expression listing and can output the remaining expressions in the plausible expression listing as the candidate set of repairable expressions 120. Alternatively, where the EFDM 104 generates a flexible expression listing, the controller 108 can compare the flexible expression listing with the plausible expression listing generated by the PEI 102 and can remove expressions not present in the flexible expression listing from the plausible expression listing. The controller 108 can output the resulting listing as the candidate set of repairable expressions 120. In an alternative embodiment, the controller 108 can output the listings generated at steps 306 and 308 to the user, who, in turn, can himself determine the candidate set of repairable expressions 120 by comparing the listings in the same manner discussed above with regard to the determination of the candidate set of repairable expressions 120. As discussed above, the candidate set of expressions can enable a programmer or user to identify likely causes of bugs and determine an appropriate modification of the program to repair any bugs. Moreover, in any scenario, the controller 108 can output, with one or more of the corresponding expressions, the values that result in passage of the failing test to guide the programmer or user in determining how to repair bugs.

It should be noted that the method 300, and also method 200, can be modified in a variety of different ways. For example, the EFDM 104 can generate the flexible/inflexible expression list at step 308 before the PEI 102 generates the plausible expression list at step 306. For example, the EFDM 104 can evaluate each expression in the program to determine the flexibility of the expressions. Thereafter, the PEI 102 can evaluate the inflexible expressions to determine whether the inflexible expressions can be replaced with a value that results in passage of the failing test. Alternatively, the PEI 102 and the EFDM 104 can generate the respective lists at steps 306 and 308 independently by evaluating all of the expressions in the program. It should be further noted that any reference to a program with regard to evaluation of expression in methods 200 and 300 can be an entire program or one or more portions of the program, such as those defined by a user in a program scope received at optional step 204 or 304. Moreover, it should be understood with regard to method 200 that although the method 200 can be performed by generating lists, the generation of the listings are not necessary features of method 200. For example, in accordance with one embodiment, each expression can be evaluated in turn by performing steps 206 and 208 for a first expression, performing steps 206 and 208 for a second expression, etc. Thereafter, each plausible and flexible expression can be output at step 210 as a list or can be output sequentially after each determination that the expression is plausible (step 206) and flexible (step 208). In addition, similar to the method 300, step 208 can be performed prior to step 206.

To better illustrate how the system 100 can implement the method 300, the following program code in Table 1 is considered.

TABLE 1

Triangles Example

| | |
|---|---|
| 1 | public int classify(int a, int b, int c) { |
| 2 |     int retval; |
| 3 |     if (a >= b && b >= c) { |
| 4 |         if (a == c \|\| b == c) { |
| 5 |             if (a == b && a == c) |
| 6 |                 retval = EQUILATERAL; |
| 7 |             else |
| 8 |                 retval = ISOSCELES; |
| 9 |         } else { |
| 10 |             if (a*a != b*b + c*c) { |
| 11 |                 if (aa < b*b + c*c) { |
| 12 |                     retval = ACUTE; |
| 13 |                 } else { |
| 14 |                     retval = OBTUSE; |
| 15 |                 } |
| 16 |             } else { |
| 17 |                 retval = RIGHT; |
| 18 |             } |
| 19 |         } |
| 20 |     } else { |
| 21 |         retval = ILLEGAL; |
| 22 |     } |
| 23 |     return retval; |
| 24 | } |

The program takes as input lengths of three sides of a triangle, presented in non-decreasing order, and it is supposed to classify the triangle as one of equilateral, isosceles, right angled, acute, or obtuse. Table 2 below shows eight sample inputs to the program. The code works correctly for inputs T1-T7, but not for T8.

It can be assumed that the program is known to be fixable, in the specific sense that there is a single expression that, if altered, will permit all of the test inputs to pass. It is the task of the programmer to find the faulty expression and repair it.

Assuming that the user or a computing system (not shown) provides the program of Table 1 in accordance with steps 202/302 discussed above, the programmer can hypothesize and provide a program scope in accordance with optional steps 204/304. For exemplary purposes, it can be assumed that the entire program is in the scope.

At steps 206/306, the PEI 102 can determine the repair candidates for the failing test T8. These candidates are shown in Table 3 below. Each repair candidate could have salvaged this particular execution by evaluating to a different value than it did during normal execution of the program. The column titled "alt value" lists the alternate value that would have made T8 pass. For example, the first row in Table 3 provides that if the value 7 were to be produced in place of the highlighted expression a, whose runtime value is 26, T8 would pass.

For brevity, only reads of local variables and constants have been considered, but there is no conceptual reason to exclude arithmetic and logical expressions from consideration by the PEI 102 (e.g., the result of a==c). Among the kinds of expressions considered here, the repair candidates listed are the only possible repair candidates.

TABLE 2

Inputs for Program of Table 1

| Test | a | b | c | Expected outcome |
|---|---|---|---|---|
| T1 | 2 | 12 | 27 | ILLEGAL |
| T2 | 5 | 4 | 3 | RIGHT |
| T3 | 26 | 7 | 7 | ISOSCELES |
| T4 | 19 | 19 | 19 | EQUILATERAL |
| T5 | 14 | 6 | 4 | OBTUSE |
| T6 | 24 | 23 | 21 | ACUTE |
| T7 | 7 | 5 | 6 | ILLEGAL |
| T8 | 26 | 26 | 7 | ISOSCELES actual outcome: ACUTE |

TABLE 3

Repair Candidates for Program of Table 1

| line# | code | alt value (T8) | inhibitor |
|---|---|---|---|
| 4 | if(a==c || b==c){ | 7 | |
| 4 | if (a == c || b == c) { | 26 | |
| 4 | if(a==c || b==c){ | 7 | T3 |
| 4 | if(a==c || b==c){ | 26 | T3 |
| 12 | retval = ACUTE | ISOSCELES | T6 |

At steps 208/308, the EFDM 104 can employ the passing test cases to permit the controller 108 to filter out the inflexible repair candidates at steps 210/310, leaving the right choice and one wrong choice. The inflexible repair candidates are indicated in the last, rightmost column of Table 3. For example, the last row of Table 3 indicates that there is no reason to attempt to change the value of ACUTE at line 12 to ISOSCELES, as doing so will rescue T8, but break test T6, whose correct outcome is in fact ACUTE. This much would be clear to a programmer. The other two choices that the methods 200/300 eliminates from consideration on the basis of test T3 may not be clear to a programmer.

Given the information in Table 3, which the controller 108 can output at steps 210/310, a programmer can consider each of the remaining two candidates in turn, and can try to find a syntactic replacement that produces an acceptable value for T8, and moreover, works for all the other test cases (T1-T7) as well. It should be noted that the concrete values that Table 3 suggests are specific to the failing test T8. Of these two candidates, the first choice (first row) is in fact futile, but that information has not been obtained from the passing tests. The second choice (second row) is the real bug, as it should be b in place of c.

The methods 200/300 can be deemed "angelic debugging" because it can rely on angelic nondeterminism. For example, an expression can be thought of as being replaced with a call to an oracle that returns a value, chosen nondeterministically. The oracle is both omniscient and co-operative, in the sense that if a suitable value exists—one that makes the failing input now pass—the oracle is guaranteed to return it. While supporting angelic nondeterminism is computationally expensive, it is becoming increasingly viable for selective use due to recent advancements in decision procedures. In this case, angelic non-determinism can be used only on one expression at a time. Although this can limit the kinds of defects on which the technique is effective, it enhances computational feasibility. As such, as opposed to employing nondeterminism in testing to create an adversary (a demonic oracle), it can be used as an ally.

As described above, one aspect of the present principles advantageously involves the use of information from passing tests to filter out repair candidates that will not work out. While the programmer still performs the laborious task of finding replacement expressions for multiple repair candidates, he need not carry out a seemingly endless and unavailing effort in searching for replacement expressions for repair candidates that are destined to cause another test case to fail. The space of replacement expressions can be significantly large, and use of the passing tests in this manner can immediately indicate to a programmer that a replacement expression will not repair the bug. Furthermore, the use of the passing tests in this manner provides this indication without requiring the programmer to posit a replacement expression. Previous work that has leveraged information from a suite of passing tests for fault localization has relied on indirect information. Such anomaly based techniques give a statistical ranking of likely causes of errors, but do not pinpoint exactly where the program should be fixed. Sometimes, the information computed on the basis of statement coverage may be quite far from the root cause of an error. This information, while useful in fault localization, does not directly indicate whether a specific expression can be changed. In contrast, aspects of the present principles can employ passing tests to provide this indication.

To further aid in understanding of the present principles, a more specific technical overview of angelic debugging is provided. For expository reasons, it can be assumed here that each expression has a single dynamic occurrence. Analyzation of expressions in the form of loops and procedure calls in practice is described further below. Hereafter, a reference to an expression e is a reference to a specific occurrence of e in the program.

As discussed above, methods 200/300 can employ angelic execution of a program. In angelic execution, the system 100 can interpret a selected expression in the program as a query to an angel, whose job is to return a value—if one exists—that would make the program pass. The "angel" can be implemented in the PEI 102 and/or the EFDM 104. $P[\alpha/e]$ is denoted as the program obtained by replacing the occurrence of e in P by a symbolic variable $\alpha$. For a given expression e and input I, Angelic Test is defined as follows:

$$\text{AngelicTest}(P,I,e) = \exists \alpha \cdot \text{Test}(P[\alpha/e], I)$$

The expression Test(P,I) above is true if interpreting P on I produces the expected outcome (provided with 1) within a bounded amount of time. It is false otherwise.

As described above, a repair candidate is an expression that, if replaced by another expression, can rescue a failing run. The PEI 102 can specify an initial set of repair candidates as follows:

$$\{e | \text{AngelicTest}(P,I,e)\}$$

Figure 4:
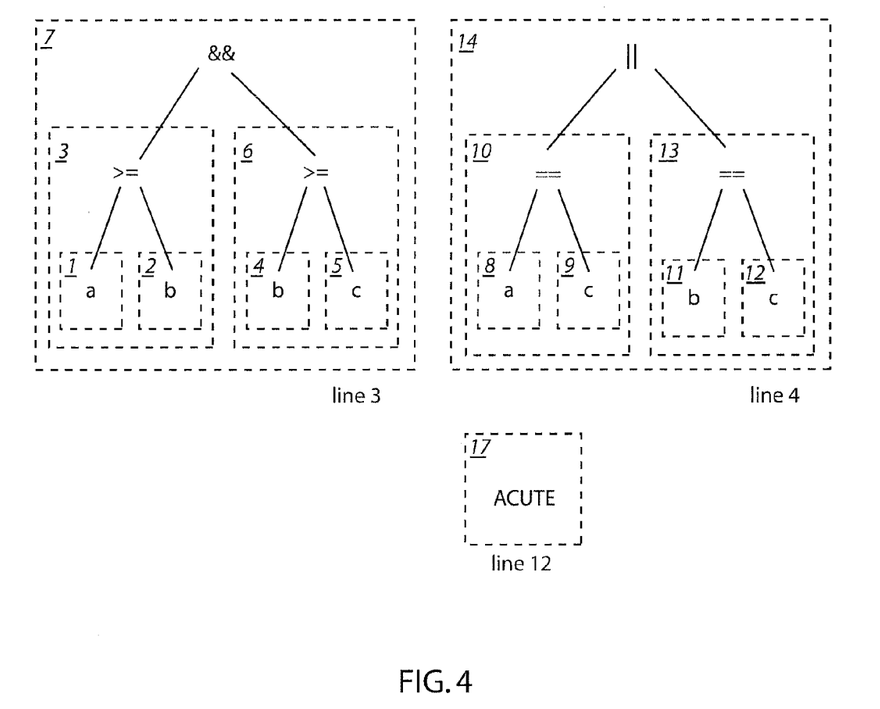
FIG. 4 is a diagram of expressions that are on a path executed with a failing input for an exemplary program.

To obtain an initial list of repair candidates in accordance with steps 206/306, the PEI 102 can carry the path taken by the failing execution. Of course, once an angelic value is obtained, the program may proceed along a different, successful path if one exists. For compound expressions, the PEI 102 can test sub-expressions to determine whether they are repair candidates as well. FIG. 4 shows the various expressions that are on the path executed by the failing input for the program in Table 1. For each $e_i$, where i ranges from 1 to 27, the PEI 102 can invoke AngelicTest(P,I,$e_i$) to compute the set of repair candidates at steps 206/306. The blocks in FIG. 4 are labeled as i corresponding to the expression $e_i$. This process identifies the five repair candidates mentioned in Table 3, as the other expressions cannot rescue the failing run regardless of the values they return.

Because the PEI 102 here considers each expression on the faulty path for angelic valuation, the PEI 102 will indeed find all potential repair candidates. In accordance with exemplary aspects, the PEI 102 can apply various static analyses to optimize this process. Applying AngelTest will also yield a concrete value for each repair candidate that would rescue the given test input.

In turn, the EFDM 104 can leverage the passing test inputs at steps 206/306. For example, given a repair candidate e, and a passing test input I, the EFDM 104 can determine whether the program will still pass if the EFDM 104 substitutes e with a different value than what e evaluates to on this input. If the answer is no, then the EFDM 104 can determine that e is not a good repair candidate. The EFDM 104 can make the determination of whether the program will pass by the substitution by utilizing angelic execution via the following flexibility check:

$$FlexTest(P,I,e) = \exists \alpha \cdot (Test(P[\alpha/e],I) \wedge \alpha \neq Eval(P,I,e))$$

Eval(P,I,e) is defined as the value obtained by evaluating the expression e in the course of interpreting the program P on the input I. If e is not visited while executing P on I, Eval(P,I,e) is undefined and FlexTest(P,I,e) is trivially true.

Given a failing input $I_f$ and passing inputs $I_{p_1} \ldots I_{p_k}$ the good repair candidates are:

$$\{e | AngelicTest(P,I_f,e) \wedge \forall i \in [1 \ldots k] \cdot FlexTest(P,I_{p_i},e)\}$$

For example, the last row of Table 3 is considered. The only passing test case in which line 12 is visited is T6, so it is pertinent to make the determination of whether the program will pass by the substitution only for test T6. T6 can pass only when the value of ret val at line 12 is ACUTE; no other value would permit T6 to pass. Hence, T6 rules out that repair candidate. Line 12 sets the (constant) return value, which clearly is not the right fix, and the EFDM 104 via the flexibility test discovers that it is not the right fix. In other cases, inflexibility of expressions may not be clear, such as the inflexibility of repair candidates ruled out by T3.

One rationale for employing the flexibility check is that, if an expression e in the program is the right repair candidate, replacing e with some as-yet-undetermined expression e' should not result in other errors in the program. The expression e may not be the right repair candidate i if replacing it with any expression e' could make one or more of the passing test cases fail. In accordance with one aspect of the present principles, the EFDM 104 and the controller 108 can take advantage of passing test cases without knowing e'.

For example, an ideal consideration is, given a repair candidate—i.e., an expression e—and given a passing test case T, whether it is possible for T to continue to pass if e is replaced by a different expression e'. If not, then e is not the expression to fix because it will break T (and in this example, only one fix to the program is permissible).

Since the ideal question is generally too expensive to answer, aspects of the present principles consider values as an approximation to the ideal consideration. For example, the approximate consideration is, given a repair candidate e, and given a passing test case T, whether it is possible, if e produces the value v when T is run, for T to continue to pass if e is replaced by some v', where v≠v'. If it is possible, then the answer to the ideal question is also yes. On the other hand, if the answer to the approximate question is no, then the answer to the ideal question is probably no; but it is not guaranteed to be no. However, the mathematical likelihood of being wrong can be reduced by relying on many passing tests, together with making the notion of flexibility from a Boolean to a quantitative property that would estimate the likelihood that an expression is flexible.

If the desired fix to a program is a single expression that should be altered—or any one of a set of single expressions—to fix a bug, the exemplary methods described herein will eventually find the expression. Such programs are denoted here as 1-fixable. If a program is not 1-fixable, the methods can suggest a repair candidate that is not the desired fix, but that can often inspire the actual fix. For example, if the program is missing a certain assignment to a field, then the repair candidate provided by the system 100 may suggest a fix at a point downstream where the field is used.

It should be noted that there are many ways to implement the methods and systems described above. In accordance with one exemplary aspect, the PEI 102, EFDM 104 and the controller 108 can be embodied as a symbolic execution engine that is based on an explicit-state model checker. The engine can implement the functions AngelicTest and FlexTest in three phases.

In the first phase, which the PEI 102 can perform at steps 206/306, the engine executes the failing test concretely, collecting the labels of all executed statements in a trace f. Each label in f gives a unique identity to a dynamically occurring bytecode instruction. It can be thought of as the bytecode index that an executed instruction would have if all loops in the program were unwound and all method calls inlined.

In the second phase, which the PEI 102 can perform also at steps 206/306, the failing test is re-executed |f| times to find all statements in f that are potential repair candidates. The $i^{th}$ execution in this phase is concrete until it reaches the $i^{th}$ statement f[i], at which point the engine replaces the concrete value returned by f[i] with a symbolic value $s_i$. From then on, the values of all branch predicates that depend on the output of f [i] are encoded as constraints over $s_i$. This process is described in more detail below. If there is a path through the program in which all branch constraints are satisfied, and which does not lead to a failure, then the engine has found a value that fixes the failing test and f [i] is placed in the repair candidate set R.

The third phase of the analysis, which the EFDM 104 and the controller 108 can perform at steps 208/308 and steps 210/310, respectively, uses the available passing tests to prune R. For example, at steps 208/308, the EFDM 104 can first execute each passing test concretely to collect a trace p . Next, at steps 208/308, for each statement pp [i] that is in R, the EFDM 104 can execute the prefix pp [0 . . . i] of p concretely. This includes the statement pp [i], whose concrete execution produces the concrete value $c_i$. Also at steps 208/308, the EFDM 104 can then replace $c_i$ with a symbolic value $s_i$ and search for a failure-free path through the program in which $s_i$ is different from $c_i$. If the EFDM 104 finds such a path, then the EFDM 104 deems p [i] is to be flexible. Thus, if the EFDM 104 deems p [i] to be flexible, then, at steps 210/310, the controller 108 will keep it as a repair candidate. Otherwise, if the EFDM 104 deems p [i] to be inflexible, then, at steps 210/310, the controller 108 removes p [i] from R.

Figure 5:
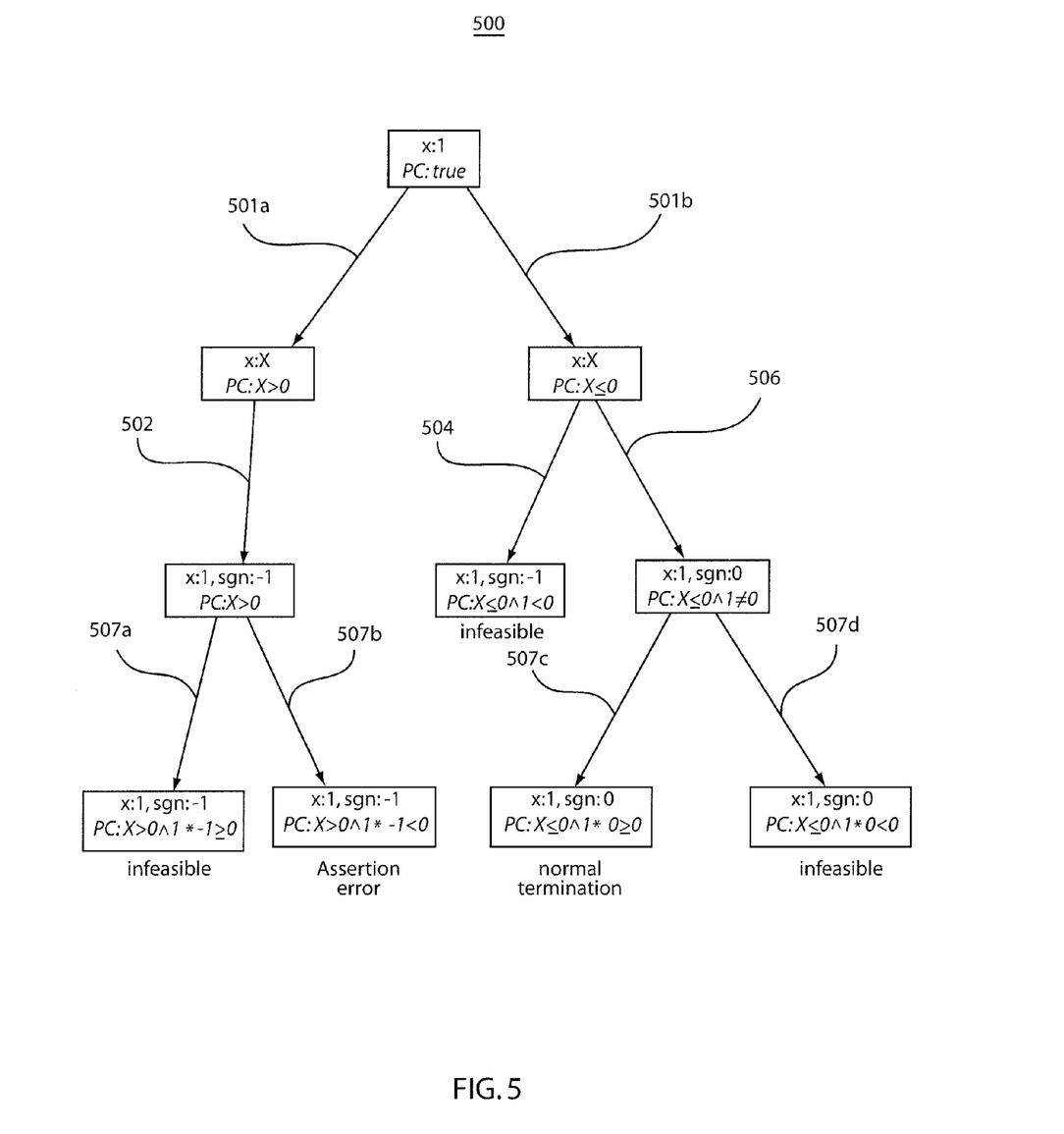
FIG. 5 is a diagram of a symbolic execution tree for an exemplary integer program.

With regard to symbolic execution of integer programs discussed above with respect to steps 206/306 and steps 208/308, to execute a program in which an integer-valued expression is treated symbolically, the PEI 102/EFDM 104 employs a classic approach of searching for a failure-free path in the program's symbolic execution tree. An example 500 of such a tree is shown in FIG. 5. The symbolic execution tree 500 of FIG. 5 corresponds to the buggy implementation of the signum function shown below in Table 4:

TABLE 4

Program Code for the Symbolic Execution Tree of FIG. 5

```
x = 1;
1 if (x > 0)
2       sgn = -1;
3 else if (x < 0)
4       sgn = -1;
5 else
6       sgn = 0;
7 assert x * sgn >= 0;
```

The nodes in the tree 500 represent program states, and the edges are transitions between states. For example, the edges 501a and 501b correspond to line 1 in Table 4, edge 502 corresponds to line 2 in Table 4, edge 504 corresponds to line 4 in Table 4, edge 506 corresponds to line 6 in Table 4, and edges 507a-507d correspond to line 7 in Table 4. Each state includes the (symbolic or concrete) values of program variables; a path condition (PC); and a program counter. The path condition is a boolean formula over symbolic values that encodes the conditions under which a given execution path can be taken; i.e., the path condition is satisfiable only along feasible paths. The program counter, shown as the edge label, specifies the next statement to be executed from the given state.

The tree 500 illustrates an execution of the program in which the concrete value of the variable x on line 1 is replaced with the symbolic value X. All other occurrences of x remain concrete. The root of the tree represents the initial state of the execution, in which x has the concrete value 1 and the path condition is true. At each branch point, the PEI 102/EFDM 104 updates the PC to reflect which path is taken. For example, evaluating the conditional on line 1 and taking the true-branch leads to the left child of the root, in which x has the symbolic value X and the path condition is X>0. Whenever the path condition becomes false, or an error state is reached, the execution along that path terminates, and the search backtracks. In this example, the PEI 102/EFDM 104 may explore three different paths (two infeasible and one erroneous) before reaching the highlighted passing state. The remaining infeasible path is shown for completeness; the search terminates as soon as the highlighted state is discovered.

It should also be noted that the PEI 102/EFDM 104 can also perform symbolic execution of heap-manipulating programs at steps 206/306 and steps 208/308. For example, to analyze a program in which a reference value is symbolic, the PEI 102/EFDM 104 can employ a variant of a generalized symbolic execution algorithm. The algorithm works like the basic symbolic execution of integer programs described above, except when it encounters a field access to a symbolic reference s. In this case, the PEI 102/EFDM 104 performs a lazy concretization of s and proceeds as described above with regard to symbolic execution of integer programs. The lazy concretization process involves choosing a concrete value for s; recording that choice in the path condition; and, if the updated path condition is satisfiable, replacing all occurrences of s with the chosen concrete value. Here, the possible concrete values for s can include: null; an existing concrete reference of the same type as s; and a reference to a new object (also of the same type as s) with all of its fields initialized to fresh symbolic values. In contrast to previous works, where only certain aliasing relationships are considered, this choice of concrete values accounts for all aliasing that s may exhibit.

Figure 6:
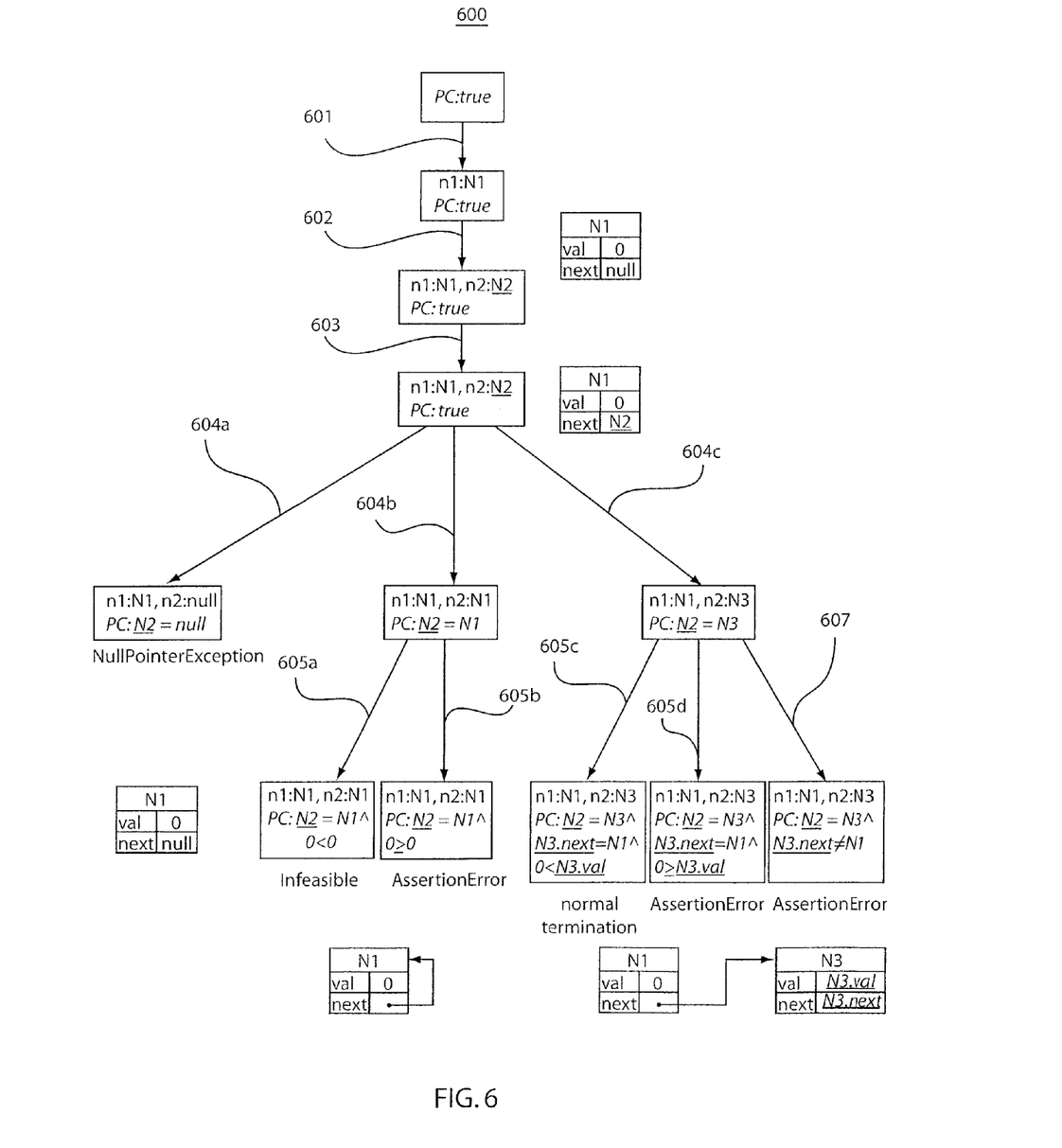
FIG. 6 is a diagram of a symbolic execution tree for an exemplary heap-manipulating program.

FIG. 6 illustrates a generalized symbolic execution tree 600 for the buggy heap-manipulating program provided below in Table 5. Similar to the tree 500, the nodes in the tree 600 represent program states, and the edges are transitions between states. Here, edges 601-603 correspond to lines 1-3, respectively, in Table 5, edges 604a-c correspond to line 4 in Table 5, edges 605a-d correspond to line 5 in Table 5 and edge 607 corresponds to line 7 in Table 5. The tree 600 characterizes the execution of the program in which the reference produced by the new expression on line 2 in Table 5 is treated symbolically. Each program state (i.e., tree node) is shown together with its corresponding heap. An object in the heap is represented by a table that maps field names to values. Symbolic values are underlined, and concrete references are represented by arrows.

TABLE 5

Heap-Manipulating Program Code for the Tree of FIG. 6

```
class Node {
    int val = 0;
    Node next = null;
}
1 Node n1 = new Node( );
2 Node n2 = new Node( );
3 n1.next = n2;
4 if (n2.next == n1) {
5     assert n1.val < n2.val;
6 } else {
7     assert false;
8 }
```

Executing the first two lines of the heap-manipulating program results in the creation of concrete objects N1 and N2, whose fields are initialized to default values. To avoid cluttering FIG. 6, it is assumed that the execution of line 2 has no effect on the heap; it simply introduces a new symbolic reference N2 to which the variable n2 is bound. Line 3 of the heap-manipulating program sets the "next" field of N1 to the symbolic reference N2. Line 4 dereferences n2, which triggers the concretization of N2. Setting N2 to null leads to a null pointer exception, causing the search to backtrack. The next choice, N1, leads to an infeasible path and an assertion failure. The last choice—setting N2 to a fresh object N3 with symbolic field values—results in a failure-free path. The remaining erroneous paths are shown for completeness purposes.

It should be understood that the system 100 can be implemented in several different ways and can incorporate many different variations. In one embodiment, the system can be implemented as a tool built on top of the JAVA PATHFINDER (JPF) model checker to support angelic debugging. The tool can accept as input a Java program, a failing test case, and a suite of passing test cases. The default scope can be the entire program, where a programmer can specify scopes at various granularities, such as a class file, a method and/or a range of lines. The tool can output information of the kind shown in Table 3 above. Further, the tool need not take any specification or annotation, as the tool can base its findings only on the inputs accepted, as mentioned above. Remarkably, the tool can not only find faulty arithmetic and logical expressions, but also faulty heap references for which it suggests alternative heap values. This feature is important for handling typical bugs in Java programs.

It should be noted that JPF is a Java Virtual Machine that is capable of backtracking to a given point in the execution and proceeding along a different path. The tool can be patterned after the SYMBOLIC JPF (SJPF). The extension mechanisms provided by JPF can be used to force non-standard interpretation of instructions that use or define symbolic values. Path conditions can be checked for satisfiability using the Choco constraint solver. In alternative implementations, the constraint solver can be supplemented with dynamic execution.

Procedure calls can be handled automatically by JPF's dispatch mechanism. To ensure that calls to symbolic receivers can be resolved, the tool keeps track of the runtime type of each symbolic reference.

One subtle issue arises when FlexTest, described above, is performed on a reference. Since the solution to heap constraints discussed above permits the manufacture of new objects, the constraint of dis-equality ($\neq$) between the Eval value and the newly constructed value ($\alpha$) is satisfied trivially. If a programmer's notion of equality is not based on reference equality, but rather on an equals predicate, then the flexibility check is not meaningful. To implement a meaningful equality test, the system can preserve a snapshot of the field values as observed in the default execution—i.e., as computed by Eval. In principle, the system would then have JPF execute the programmer-provided equals method to compare the snapshot to the replacement value $\alpha$.

The debugging methodology described herein takes advantage of plentiful compute cycles—and thus saves programmer's time—to provide an indication of where to fix a bug in a program. Moreover, aspects of the present principles employ a novel way of leveraging information in passing test inputs to eliminate non-productive repair candidates.

Having described preferred embodiments of systems and methods for precise fault localization (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for identifying expressions that are potential causes of program bugs implemented by a computer processor comprising:
   receiving a program and at least one input resulting in at least one passing test of the program;
   identifying at least one plausible repair candidate expression in the program;
   determining whether replacement of the at least one identified expression with at least one value, which is different from a value computed by the at least one identified expression, maintains the passage of the at least one passing test; and
   outputting the at least one identified expression when the replacement maintains the passage of the at least one passing test to enable a determination of a modification of the program that repairs a bug in the program.

2. The method of claim 1, wherein the receiving further comprises receiving at least one second input resulting in a failing test of the program and wherein the identifying further comprises determining that replacement of the at least one identified expression with at least one value results in a passage of the failing test of the program.

3. The method of claim 2, further comprising:
   receiving a program scope from a user that limits the identifying and the determining to at least one portion of the program.

4. The method of claim 2, wherein the outputting further comprises outputting the at least one value that results in a passage of the failing test of the program.

5. The method of claim 2, wherein the identifying further comprises processing each expression in at least a portion of the program with the at least one second input to determine a first set of expressions that are replaceable with corresponding values that result in passage of the failing test of the program.

6. The method of claim 5, wherein the determining further comprises processing each expression in the at least a portion of the program with the at least one input resulting in the at least one passing test to determine a second set of expressions that are replaceable with corresponding values that result in failure of the at least one passing test.

7. The method of claim 6, wherein the outputting further comprises outputting the first and second sets of expressions.

8. The method of claim 6, wherein the outputting further comprises comparing the first and second sets of expressions and outputting the expressions in the first set that are not present in the second set.

9. A non-transitory computer readable storage medium comprising a computer readable program code, wherein the computer readable program code when executed on a computer causes the computer to:
   receive a program and at least one input resulting in at least one passing test of the program;
   identify at least one plausible repair candidate expression in the program;
   determine whether replacement of the at least one identified expression with at least one value, which is different from a value computed by the at least one identified expression, maintains the passage of the at least one passing test; and
   output the at least one identified expression when the replacement maintains the passage of the at least one passing test to enable a determination of a modification of the program that repairs a bug in the program.

10. A method for identifying expressions that are potential causes of program bugs implemented by a computer processor comprising:
   receiving a program, a first set of inputs resulting in a failing test of the program, and a second set of inputs resulting in at least one passing test of the program;
   generating a first listing of expressions in the program by symbolizing a first set of expressions in at least a portion of the program and by selecting expressions that are replaceable with corresponding values that result in passage of the failing test with the first set of inputs;
   generating a second listing of expressions in the program by symbolizing a second set of expressions in the at least a portion of the program and determining whether replacing expressions in the second set of expressions with values results in failure of the at least one passing test; and outputting at least one expression in the first listing that is replaceable with a value, which is different from a value computed by the at least one expression in the first listing, that maintains the passage of the at least one passing test to enable a determination of a modification of the program that repairs a bug in the program.

11. The method of claim 10, wherein the generating the second listing further comprises selecting expressions for inclusion in the second listing that are replaceable with corresponding values, which are different from values provided by the expressions selected for inclusion in the second listing, that maintain the passage of the at least one passing test.

12. The method of claim 10, wherein the generating the second listing further comprises selecting expressions for inclusion in the second listing that are replaceable with corresponding values that result in failure of the at least one passing test.

13. The method of claim 10, wherein the outputting further comprises determining the at least one expression for output by comparing the first and second listings.

14. The method of claim 10, wherein the outputting comprises outputting the first and second listings.

15. The method of claim 10, further comprising:
receiving a program scope from a user that identifies the at least a portion of the program.

16. The method of claim 10, wherein the generating the first listing further comprises labeling expressions in a trace of the program run with the first set of inputs and iteratively re-executing the at least a portion of the program with the first set of inputs to independently symbolize each labeled expression.

17. The method of claim 16, wherein each iteration of re-executing comprises performing concrete execution of the at least a portion of the program until the execution reaches the corresponding labeled expression that is symbolized with a given value and comprises encoding branch predicates depending on an output of the symbolized expression as constraints over the given value.

18. The method of claim 17, wherein the generating the second listing further comprises executing each passing test to obtain a passing trace and iteratively re-executing the at least a portion of the program with inputs resulting in the at least one passing test to independently symbolize each expression in the passing trace that is included in the first listing.

19. A system for identifying expressions that are potential causes of program bugs comprising:

a plausible expression identifier configured to identify at least one plausible repair candidate expression in a program based on a failing test of the program;

an expression flexibility determination module configured to determine whether replacement of the at least one identified expression with at least one value, which is different from a value computed by the at least one identified expression, maintains the passage of at least one passing test; and a controller configured to output the at least one identified expression when the replacement maintains the passage of the at least one passing test to enable a determination of a modification of the program that repairs a bug in the program.

20. The system of claim 19, wherein the plausible expression identifier and the expression flexibility determination module are further configured to receive a program scope from a user that limits analysis of expressions to at least one portion of the program.

21. The system of claim 19, wherein the plausible expression identifier is further configured to determine that replacement of the at least one identified expression with at least one corresponding value results in passage of the failing test of the program and wherein the controller is further configured to output the at least one corresponding value.

22. The system of claim 19, wherein the plausible expression identifier is further configured to process each expression in at least a portion of the program with inputs resulting in the failing test to determine a first set of expressions that are replaceable with corresponding values that result in passage of the failing test of the program.

23. The system of claim 22, wherein the expression flexibility determination module is further configured to process each expression in the at least a portion of the program with inputs resulting in at least one passing test to determine a second set of expressions that are replaceable with values, which are different from values provided by the second set of expressions, that result in failure of the at least one passing test.

24. The system of claim 23, wherein the controller is further configured to output the first and second sets of expressions.

25. The system of claim 23, wherein the controller is further configured to compare the first and second sets of expressions and to output the expressions in the first set that are not present in the second set.

* * * * *